United States Patent [19]

Middleton et al.

[11] Patent Number: 4,547,400

[45] Date of Patent: Oct. 15, 1985

[54] METHOD OF MAKING INFRARED REFLECTIVE GLASS SHEET-I

[75] Inventors: Daryl J. Middleton, Nashville, Tenn.; Jodyne I. Grenier, Noblesville, Ind.

[73] Assignee: Ford Motor Company, Dearborn, Mich.

[21] Appl. No.: 705,295

[22] Filed: Feb. 25, 1985

[51] Int. Cl.[4] .............................................. C03C 17/22
[52] U.S. Cl. ...................... 427/160; 65/60.2; 427/109; 427/110; 427/166; 427/168
[58] Field of Search ............... 427/109, 110, 160, 166, 427/168; 65/60.2

[56] References Cited

U.S. PATENT DOCUMENTS

| | | | |
|---|---|---|---|
| 4,144,362 | 3/1979 | Larkin | 427/226 |
| 4,419,386 | 12/1983 | Gordon | 427/109 |
| 4,440,822 | 4/1984 | Gordon | 428/216 |

Primary Examiner—James R. Hoffman
Attorney, Agent, or Firm—William E. Johnson; Clifford L. Sadler

[57] ABSTRACT

This disclosure is directed to a method of making an infrared reflective glass sheet. The method has the following steps. The glass sheet formed of soda/lime silica glass is selected. The glass sheet is heated to a temperature in a range from 900° to 1100° F. If desired, the sheet glass selected may be selected at the time it is being manufactured in a glass manufacturing operation and it would have upon leaving a process such as a float process a temperature in a range of 900° to 1100° F. An organic/metallic ion-containing, chlorine-free compound is applied to a surface of the glass sheet. Application of this compound forms a metallic oxide seal coating on the surface of the glass sheet. A coating of tin oxide is applied to the metal oxide seal coating. The coating of tin oxide is formed from the decomposition of butyltin trichloride. The glass sheet is cooled to room temperature after application of the metal oxide seal coating and the tin oxide coating thereon.

6 Claims, No Drawings

METHOD OF MAKING INFRARED REFLECTIVE GLASS SHEET-I

TECHNICAL FIELD

This application is directed to a method of making an infrared reflective glass sheet. The glass sheet so made may be used as a window in a building, the window being one which reflects infrared radiation. Utilization of such a window can reduce the amount of heat lost from the interior of the building containing the window because the window is effective in preventing the loss of infrared radiation from the interior of the building.

BACKGROUND OF THE PRIOR ART STATEMENT

The manufacture of glass windows coated with infrared radiation reflective films is known in the art, see U.S. Pat. No. 4,440,822, issued Apr. 3, 1984, entitled "Non-Iridescent Glass Structures". The purpose of placing such a coating on a glass is that the coating is effective in reflecting radiation in the infrared band. This radiation is heat radiation and if it is trapped within a building by the glass structure, the building requires less total energy to keep it heated to a particular temperature.

We are also aware of U.S. Pat. No. 4,144,362, issued Mar. 13, 1979, for "Method for Coating Glass Using Monoalkyltin Trihalides". This patent discloses a method for obtaining a stannic oxide coating on a glass surface by applying an organotin compound to a heated glass surface. The purpose of coating the glass was to improve the impact and abrasion resistance of the glass. This patent disclosed that a butyltin trichloride could be pyrolized to provide an acceptable stannic oxide coating on heated glass surfaces. As described in the patent, the stannic oxide coating in combination with a synthetic polymer coating at the cold end of the annealing lehr improved the scratch resistance of the glass article. In particular, the patent also indicated that the containers coated with this material exhibited a higher burst strength than containers coated using other prior art organotin compounds such as dimethyltin dichloride. Once again, the aforementioned '362 patent is devoid of mentioning the utilization of the butyltin trichloride in order to make infrared reflective glass sheets, and does not mention doping the film with fluoride ions.

In our opinion, it is desirable to form an infrared reflective film on a glass surface using butyltin trichloride because this material has several advantages. These advantages are:

1. The utilization of butyltin trichloride results in the application of a very smooth film on a glass surface. A smooth film is desirable because it reduces the variation in reflected color and improves the overall reflective color appearance, gives less film reflected color "texture" or "mottle" and gives a smoother reflective color variation across a glass sample than other organotin compounds such as dibutyltin diacetate (DBDA) or dibutyltin difluoride (DBDF).
2. Butyltin trichloride, especially n-butyltin trichloride (NBTC) is very soluble in a water-miscible solvent such as methanol. This allows a wide range of organotin compound concentration solutions to be used as well as allowing doping with water soluble fluoride compounds such as ammonium fluoride. The high concentrations of butyltin trichloride possible allows rapid formation of relatively thick films (150 to 1000 nanometers) at high volume glass throughout with minimum cooling of the glass substrate due to solvent evaporation and limited spray zone length.
3. Butyltin trichloride does not hydrolyze in water like most inorganic tin chlorides, therefore allowing the use of water soluble fluorides such as ammonium fluoride as the fluoride dopant.
4. Butyltin trichloride allows formation of good infrared reflecting films without the use of organic solvents. This eliminates the need for costly hydrocarbon emission control equipment and the use of flammable or toxic solutions.
5. The combination of lower organic content and presence of chlorine in the butyltin trichloride solutions doped with fluorine improves the electroconductivity and infrared reflectance of the resulting film over other organotin compounds. The butyltin trichloride-induced film has a grain structure which gives improved electroconductivity.
6. The relatively high vapor pressure of butyltin trichloride at room temperature allows spraying on the glass ribbon with less cooling than most tin compounds. This high vapor pressure also allows vapor as well as solution spraying to form the films. In vapor spraying, the butyltin trichloride can be doped with fluorine-containing compounds such as 1,1,2, trichloro-1,1,2, trifluoroethane to obtain the proper level of fluoride doping.
7. The amount of fluoride ion doping in the butyltin trichloride solutions and the $SnO_x$ film to obtain good electroconductivity is much less than in other organotin solutions, such as those employing dibutyltin diacetate (DBDA) and dibutyltin difluoride (DBDF). This results in less fluoride emissions.
8. With a sealant coating of film under the film produced by applying the butyltin trichloride solution, the result is a very clear, transparent film of high visible transmittance. The haze caused by the butyltin trichloride can also be reduced to acceptable levels by exhausting the overspray and spray by-products downstream away from fresh glass, or by producing thinner films by using more dilute butyltin trichloride concentrations. In either case, the objective is to reduce the chloride concentration on the fresh glass surface.

As an additional matter, when one is dealing with infrared reflective glass, very desirable infrared reflective properties may be achieved at relatively low thicknesses of films from butyltin trichloride as compared to those from other materials, for example, dibutyltin diacetate doped with fluoride ions. However, we found that when we applied butyltin trichloride directly to the surface of the glass sheet, there was the undesirable interaction of the chlorine in the spray material and the sodium on the surface of the glass sheet which resulted in the formation of crystals of sodium chloride. Formation of crystals resulted subsequently in the production of voids in the film and the light scattering defect known as haze. This haze is unacceptable because it is noticeable when looking through the glass.

We found that we could solve the problem of haze production by applying a seal coating on the surface of the glass sheet prior to the application of the coating of tin oxide formed by decomposition of butyltin trichloride.

No search was conducted on the subject matter of this specification in the U.S. Patent Office or in any other search facility. We are unaware of any prior art more relevant to the subject matter of this specification than that which was set forth hereinabove.

DISCLOSURE OF INVENTION

This invention relates to a method of making an infrared reflective glass sheet. In particular, the method of our invention is directed to the making of an infrared reflective glass sheet, the glass sheet being effective to return infrared radiation received from objects placed away from the film side of the glass sheet. In accordance with the teachings of the method of this invention, an infrared reflective glass sheet is made in the following way. A glass sheet formed of soda/lime silica glass is selected. The glass sheet is heated to a temperature in a range from 900° to 1100° F. An organic/metallic ion-containing, chlorine-free compound is applied to a surface of the glass sheet. This action forms a metallic oxide seal coating on the surface of the glass sheet. Thereafter, a coating of tin oxide formed from the decomposition of butyltin trichloride is applied to the metal oxide seal coating on the glass sheet. The glass sheet is cooled to room temperature after application of the metal oxide seal coating and tin oxide coating thereon.

In accordance with detailed teachings of the method of our invention, the seal coating may have a thickness in a range from 25 to 100 nanometers. The overall thickness of the two coatings combined is in a range from 100 to 400 nanometers.

Many different materials are available to be used as the organic/metallic ion-containing, chlorine-free compound to form the seal coating. For example, dibutyltin diacetate solution doped with fluoride is a material which serves very well in this function. The seal coating produced by applying this material is a tin oxide doped with fluoride. Another material which we have found very acceptable is aluminum di[iso-propoxide] acetoacetic ester chelate. If this material is used, the seal coating is a coating of aluminum oxide.

When the method of our invention is used to form an infrared reflective glass sheet, the final glass sheet has several desirable characteristics. For example, its overall reflective color is very uniform throughout the entire extent of the film. This is particularly of value in the situation where the film is being manufactured on the float glass process. Film uniformity over the entire width of the ribbon allows the cutting of very large glass brackets. The uniformity of the film is very high and it therefore has a very desirable texture and little if any mottle. Mottle is defined as localized, nonuniform film thickness that causes a nonuniform reflective color appearance under certain lighting conditions. As an additional matter, the emissivity of the film, which is a measurement of the ability of the film to reflect infrared radiation, is very good. Normally the emissivity is 0.40 or lower. When the emissivity is in the range of 0.40 or lower, the glass has very desirable characteristics in that a double-glazed insulated unit with one pane having said emissivity on an interior surface is roughly equivalent to a triple-glazed insulated unit in thermal performance.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific embodiments.

The following description is what we consider to be preferred embodiments of the method of our invention. The following description also sets forth what we now contemplate to be the best mode of carrying out the method of our invention. The description, however, is not intended to be a limitation upon the broader principles of this method, and while preferred materials are used to illustrate the method of our invention in accordance with the requirements of the laws, it does not mean that other materials not mentioned herein cannot be used in the method.

The method of making an infrared reflective glass sheet in accordance with the teachings of our invention is initiated as follows. A glass sheet formed of soda/lime silica glass is selected. Soda/lime silica glass is the common glass manufactured throughout the world for the purpose of making window structures for buildings, motor vehicles, and many other applications. Normally, the soda/lime silica glass selected is one which has a clear body color. That is, the normal color attributed to soda/lime glass without the addition of coloring agents to secure a green, bronze, or other body tint thereto. However, the invention is equally applicable and may be used to place infrared reflective films on a glass even though that glass has a body color, for example, blue, green, bronze, gray, or any other of the well known commercial colors.

As an initial step in the method of our invention, the selected glass sheet is heated to a temperature in a range of 900°–1100° F. Of course, as is readily apparent, the selection and heating of the glass sheet may be accomplished in a single step, that is, in the manufacturing of the glass sheet in a process such as the float process. In the float process, a continuous sheet of glass is produced. As that glass leaves the float chamber, as is well known to those skilled in the art, the glass sheet will still be heated to a temperature in the desired range. Thus, the selection of the glass sheet and heating of the glass sheet may take place as a single step of producing a glass sheet which has a temperature in the desired range, the production taking place, for example, in a process such as the float process for manufacturing glass.

In accordance with the teachings of the method of our invention, an organic/metallic ion-containing, chlorine-free compound is applied to the surface of the glass sheet while in its heated condition. Application of the organic/metallic ion-containing, chlorine-free compound forms a metallic oxide seal coating on the surface of the glass sheet. Preferably, the organic/metallic ion-containing, chlorine-free compound is applied to the surface of the glass sheet in a spraying operation in which the compound had been dissolved in a suitable solvent or vapor sprayed.

One material that is usable as the organic/metallic ion-containing, chlorine-free compound is dibutyltin diacetate. This material is dissolved in a suitable solvent such as methanol and doped with a water soluble fluoride compound such as ammonium fluoride. The amount of dibutyltin diacetate dissolved in the solvent can be from 5 to 100%, but typically ranges from 20 to 30%. The amount of fluoride added can vary, but best results occur at a 2.0 F/Sn molar ratio with ammonium fluoride ($NH_4F$) as the fluoride source. The amount of water added can be up to 0.92 wt. % of the ammonium fluoride. This material is sprayed on the hot glass to develop a seal coating having a thickness in a range from about 25-100 nanometers. A purpose of the seal coating is that it must be thick enough to block out any interaction between a chlorine-containing material and sodium on the glass surface. If this material is used as the seal coating, the coating composition formed is a tin oxide coating. With this tin oxide coating being electroconductive, the infrared reflectance is improved for a given total film thickness. As the electroconductivity of the sealant film improves, the electroconductivity of the two-solution sample approaches that of a sample of the pure overcoat of the same thickness.

Another seal coating material which may be used is aluminum di[iso-propoxide] acetoacetic ester chelate. This material is mixed with a solvent in such a proportion that the mixture has a concentration of 50 wt. % aluminum di[iso-propoxide] acetoacetic ester chelate and 50 wt. % methylene chloride. When this material is sprayed onto heated glass to achieve a seal coating, the seal coating is formed of aluminum oxide.

Many other seal coating materials may be used. The only characteristics that are required are that the seal coating be an organic/metallic ion-containing, chlorine-free compound which when applied to heated glass will react therewith in order to form a metal oxide seal coating on the surface of the glass sheet. The seal coating must be one which will not allow penetration thereof by chlorine-containing materials which would then be in a position to react with sodium on the surface of the glass to form crystals of sodium chloride. As discussed in earlier portions of this specification, the formation of sodium chloride is detrimental because such production produces voids in the film which leads to a condition known as haze or light scattering by the so-produced film.

After the metal oxide seal coating has been applied to the glass sheet, a coating of tin oxide doped with fluoride is applied to the metal oxide seal coating. The coating of tin oxide is formed from the decomposition of butyltin trichloride as this material produces a very uniform film of very uniform color. The butyltin trichloride may be applied by solution spraying or vapor spraying. For example, a solution formed of about 50% of the butyltin trichloride with the balance being methanol can be sprayed onto the glass sheet after the metal oxide seal coating has been placed thereon. One should also include in the spraying composition a small amount of a fluoride compound such as ammonium fluoride in order to get the fluoride ion into the tin oxide coating to be formed. The fluoride ion is effective to increase the IR reflectance of the glass film. The amount of fluoride needed is about 0.2 F/Sn molar ratio with an equal weight percent water. The amount of $NH_4$ or $H_2O$ may vary. The preferred butyltin trichloride compound used is normal butyltin trichloride.

The method is finished by cooling the glass sheet to room temperature after application of the metal oxide seal coating and the tin oxide coating thereon. The total thickness of these two coatings should be in a range from 100-400 nanometers to get the best characteristics from the film.

EXAMPLE 1

| Solution A (Sealant Film) | |
| --- | --- |
| Dibutyltin Diacetate | 20 Wt. % |
| Ammonium Fluoride | 6.3 Wt. % |
| Water | 5.8 Wt. % |
| Methanol | 58.0 Wt. % |
| Solution B (Overcoat Film) | |
| Butyltin Trichloride | 53.8 Wt. % |
| Ammonium Fluoride | 1.4 Wt. % |
| Water | 1.4 Wt. % |
| Methanol | 43.4 Wt. % |

With a flow rate of 0.115 gallons per minute of Solution A and 0.285 gallons per minute of Solution B, a film thickness of 180 nanometers is obtained uniformly across the ribbon with an emittance of 0.33 on ⅛ inch clear glass with a lehr speed of 250 inches per minute. The film has a visible transmittance of 83-85% and is haze-free.

EXAMPLE 2

With flow rates of 0.2 gallons per minute of Solution A and 0.6 gallons per minute of Solution B, a 400 nanometer film is obtained with an emittance of 0.23. The lehr speed is 250 inches per minute.

EXAMPLE 3

| Solution A (Sealant Film) | |
| --- | --- |
| Same as Example 1. | |
| Solution C | |
| Butyltin Trichloride | 20 Wt. % |
| Ammonium Fluoride | 0.52 Wt. % |
| Water | 0.52 Wt. % |
| Methanol | 79 Wt. % |

With flow rates of 0.115 gallons per minute of Solution A and 0.6 gallons per minute of Solution C, a film thickness of about 180 nanometers with an emittance of 0.38 is obtained on ⅛ inch clear glass with a lehr speed of 250 inches per minute.

EXAMPLE 4

| Solution D | |
| --- | --- |
| Butyltin Trichloride | 68.7 Wt. % |
| Ammonium Fluoride | 1.9 Wt. % |
| Water | 1.9 Wt. % |
| Methanol | 27.5 Wt. % |

With flow rates of 0.19 gallons per minute of Solution A and 0.56 gallons per minute of Solution D, a film thickness of about 408 nanometers with an emittance of 0.27 is obtained at a lehr speed of 231 inches per minute.

EXAMPLE 5

With flow rates of 0.12 gallons per minute of Solution A and 0.33 gallons per minute of Solution D, a film thickness of 200 nanometers with an emittance of 0.33 is obtained at a lehr speed of 231 inches per minute.

EXAMPLE 6

| Solution E | |
| --- | --- |
| Butyltin Trichloride | 77 Wt. % |
| Ammonium Fluoride | 2.0 Wt. % |
| Water | 21.0 Wt. % |

With flow rates of 0.12 gallons per minute of Solution A and 0.34 gallons per minute of Solution E, a film thickness of 201 nanometers with an emittance of 0.34 is obtained at a lehr speed of 231 inches per minute.

EXAMPLE 7

| Solution F | |
|---|---|
| Aluminum di[iso-propoxide] acetoacetic ester chelate | 50 Wt. % |
| Methylene Chloride | 50 Wt. % |

With flow rates of 0.10 gallons per minute of Solution F and 0.30 gallons per minute of Solution B, a film thickness of 180 nanometers with an emittance of 0.43 is obtained at a lehr speed of 250 inches per minute.

EXAMPLE 8

With flow rates of 0.09 gallons per minute of Solution F and 0.36 gallons per minute of Solution B, a film thickness of 225 nanometers with an emittance of 0.36 is obtained at a lehr speed of 250 inches per minute.

While particular embodiments of the method of our invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of making an infrared reflective glass sheet which comprises the steps of:
    selecting a glass sheet formed of soda/lime silica glass;
    heating said glass sheet to a temperature in a range from 900° to 1100° F.;
    applying to a surface of said glass sheet a metallic oxide seal coating which does not form sodium chloride crystals which cause the visual appearance of the film to be hazy;
    applying to said metal oxide seal coating a coating of tin oxide formed from the decomposition of butyltin trichloride doped with fluoride;
    cooling said glass sheet to room temperature after application of said metal oxide seal coating and said tin oxide coating thereon.

2. A method of making an infrared reflective glass sheet which comprising the steps of:
    forming a glass sheet of soda/lime silica glass at a temperature in a range from 900° to 1100° F.;
    applying to said metal oxide seal coating a coating of tin oxide formed from the decomposition of butyltin trichloride;
    cooling said glass sheet to room temperature after application of said metal oxide seal coating and said tin oxide coating thereon.

3. A method of making an infrared reflective glass sheet which comprises the steps of:
    selecting a glass sheet formed of soda/lime silica glass;
    heating said glass sheet to a temperature in a range from 900° to 1100° F.;
    applying to a surface of said glass sheet an organic/metallic ion-containing, chlorine-free compound to form a metallic oxide seal coating on said surface of said glass sheet;
    applying to said metal oxide seal coating a coating of tin oxide formed from the decomposition of butyltin trichloride doped with fluoride;
    cooling said glass sheet to room temperature after application of said metal oxide seal coating and said tin oxide coating thereon.

4. A method of making an infrared reflective glass sheet which comprising the steps of:
    forming a glass sheet of soda/lime silica glass at a temperature in a range from 900° to 1100° F.;
    applying to a surface of said glass sheet an organic/metallic ion-containing, chlorine-free compound to form a metallic oxide seal coating on said surface of said glass sheet;
    applying to said metal oxide seal coating a coating of tin oxide formed from the decomposition of butyltin trichloride doped with fluoride;
    cooling said glass sheet to room temperature after application of said metal oxide seal coating and said tin oxide coating thereon.

5. The method of claim 3, wherein said metal oxide seal coating has a thickness in a range of 25-100 nanometers.

6. The method of claim 5, wherein the combined coating of said metal oxide seal coating and said tin oxide coating have a thickness in a range of 100 to 400 nanometers.

* * * * *